United States Patent [19]

Mori

[11] Patent Number: 4,795,220

[45] Date of Patent: Jan. 3, 1989

[54] THRUST BEARING

[75] Inventor: Sanae Mori, Nagoya, Japan

[73] Assignee: Daido Metal Company Ltd., Nagoya, Japan

[21] Appl. No.: 110,049

[22] Filed: Oct. 15, 1987

[30] Foreign Application Priority Data

Dec. 19, 1986 [JP] Japan .................. 61-303436

[51] Int. Cl.$^4$ .............. F16C 17/04; F16C 33/10
[52] U.S. Cl. .................. 384/420; 384/368; 384/429
[58] Field of Search .......... 384/288, 294, 303, 305, 384/368, 420, 425, 427, 429

[56] References Cited

U.S. PATENT DOCUMENTS

| | | | |
|---|---|---|---|
| 1,929,009 | 10/1933 | Williams | 384/425 X |
| 2,737,423 | 3/1956 | Zeidler | 384/420 |
| 3,199,173 | 8/1965 | Lefevre | 384/420 |
| 3,495,886 | 2/1970 | Roberts et al. | 384/420 |
| 3,597,027 | 8/1971 | Herndon | 384/305 |
| 3,786,289 | 1/1974 | Baclawski et al. | 310/90 |
| 4,326,758 | 4/1982 | Nozue et al. | 384/368 |
| 4,386,859 | 6/1983 | Andrione et al. | 384/420 |

FOREIGN PATENT DOCUMENTS

| | | |
|---|---|---|
| 0182535 | 5/1986 | European Pat. Off. . |
| 16442 | 2/1977 | Japan . |
| 512668 | 9/1939 | United Kingdom . |
| 576575 | 4/1946 | United Kingdom . |
| 711075 | 6/1954 | United Kingdom . |
| 1133874 | 11/1968 | United Kingdom . |
| 1260119 | 1/1972 | United Kingdom . |
| 1401657 | 7/1975 | United Kingdom . |

Primary Examiner—Stuart S. Levy
Assistant Examiner—Thomas R. Hannon
Attorney, Agent, or Firm—Browdy and Neimark

[57] ABSTRACT

A thrust bearing which is formed by stamping a plate made of a bearing alloy material or a plate having a bearing alloy layer has an annular shape. The thrust bearing is disposed in a circumferential direction and has a plurality of recesses and projections deformed in the direction of the thickness of the bearing. The thrust bearing may have a positioning and retaining portion.

2 Claims, 3 Drawing Sheets

THRUST BEARING

BACKGROUND OF THE INVENTION

1. Field of the Invention

The present invention relates to a ring-shaped thrust bearing formed by stamping a plate.

2. Statement of the Related Art

A bush with a collar in which the collar is deformed into a corrugated shape in the direction of its thickness is disclosed in Japanese Utility Model Unexamined Publication No. 16442/1977. In this prior art, the collar is provided around the outer periphery of an end portion of a sleeve, and this bush with a collar constitutes a thrust and radial sliding bearing.

It is very difficult to manufacture thrust and radial sliding bearings as compared with manufacturing bearings without collars, so that it is very difficult to ensure high accuracy this type of bearing, and productivity is therefore low. Furthermore, according to normal usage, the radial bearing portions are used to support a high load, while the thrust bearing portions are used to support a low load. However, if the bush is constructed such as to be integrally formed with a collar, the same bearing material is inevitably used for the two portions, with the result that the costs become high.

SUMMARY OF THE INVENTION

To overcome this problem, in accordance with the present invention, a thrust bearing is formed separately from a radial bearing.

According to one aspect of the invention, there is provided a ring-shaped thrust bearing formed by stamping a plate made of a bearing alloy material or a plate having a bearing alloy layer. A plurality of circumferentially arranged indented portions obtained by deforming the thrust bearing are formed in the thrust bearing.

According to another aspect of the invention, a positioning and retaining portion which is adapted to position the thrust bearing and serves as a stopper therefor is formed in addition to the plurality of recesses and projections.

According to the present invention, both the indented portions and (or) the positioning and retaining portion can be formed simultaneously by stamping a plate. The projections constitute surfaces of contact with a shaft, while the recesses constitute channels for influx of lubricating oil. The positioning and retaining portion serves to position the thrust bearing in a housing or the like and serves as a stopper.

DESCRIPTION OF THE PREFERRED EMBODIMENTS

Figure 1:
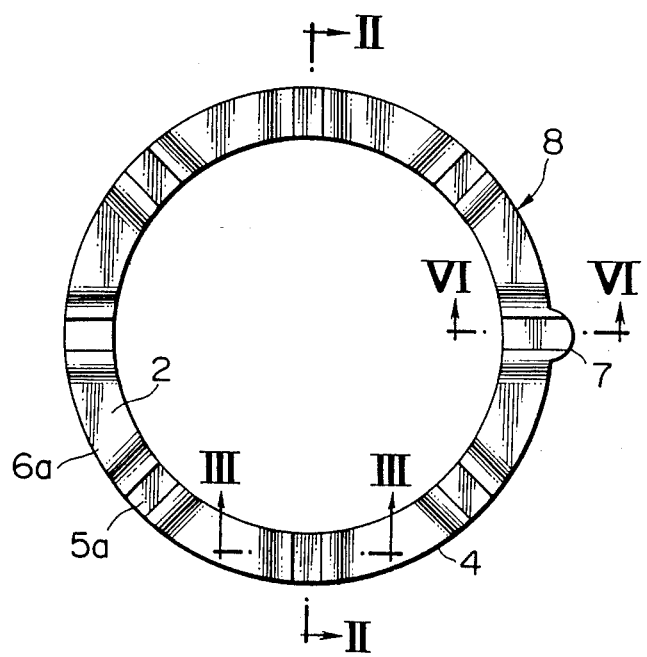
FIG. 1 is top plan view of a thrust bearing in accordance with an embodiment of the invention.
Figure 2:
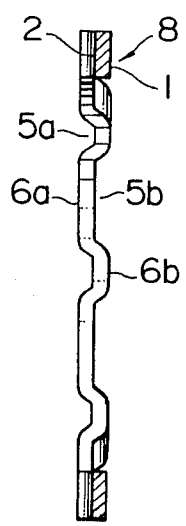
FIG. 2 is a cross-sectional view taken along the line II—II of FIG. 1.
Figure 3:
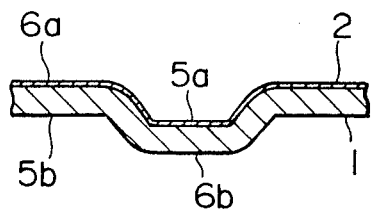
FIG. 3 is a cross-sectional view taken along the line III—III of FIG. 1.
Figure 4:
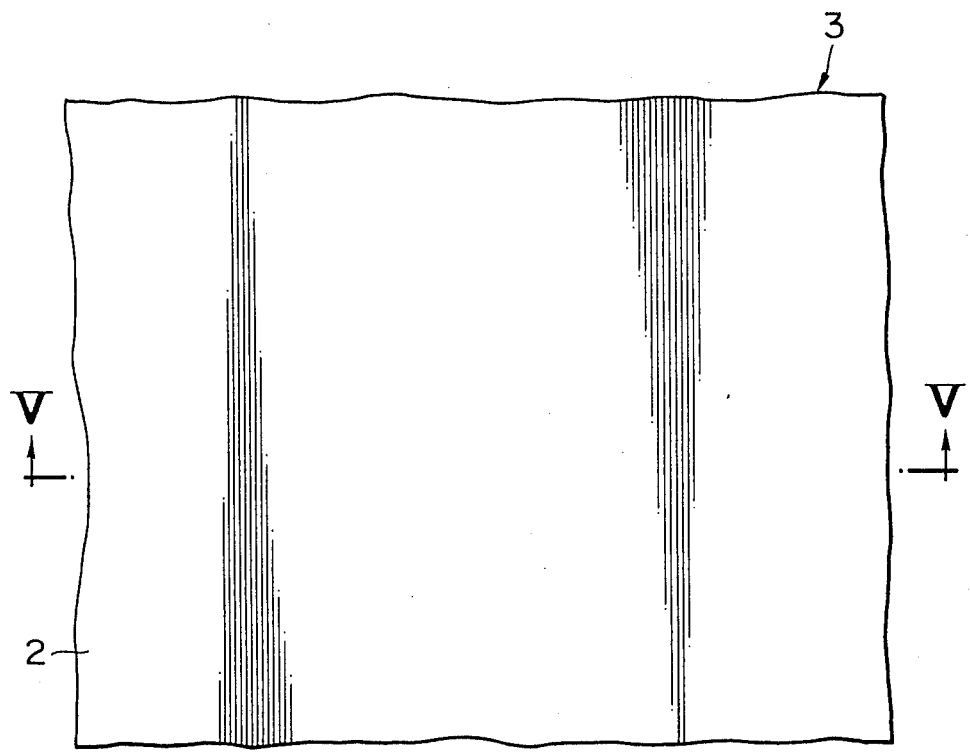
FIG. 4 is a top plan view of a bimetal which is a material of the thrust bearing.
Figure 5:
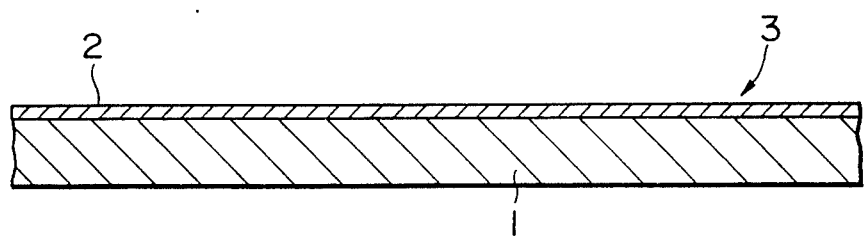
FIG. 5 is a cross-sectional view taken along the line V—V of FIG. 4.
Figure 6:
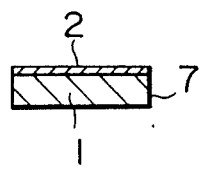
FIG. 6 is a cross-sectional view taken along the line VI—VI of FIG. 1.

A bimetal 3 shown in FIGS. 4 and 5, for instance, is used as a material of a thrust bearing, and this bimetal 3 comprises a steel backing layer 1 and a bearing alloy 2. The bimetal 3 is stamped out into an annular shape 4, as shown in FIGS. 1 to 3 and 6, by using a press. At the same time, a plurality of recesses 5a, 5b, and a plurality of projections 6a, 6b are formed by deforming the peripheral portion of the stamped piece in the direction of the thickness thereof. Furthermore, a protrusion 7 protruding radially outwardly and serving as a positioning and retaining member is formed thereon.

In a thrust bearing 8 thus formed by stamping, the plurality of projections 6a serve as sliding surfaces for supporting a load in the direction of a thrust, while the plurality of recesses 5a serve as oil grooves. Meanwhile, the plurality of projections 6b serve as surfaces engaging with a housing, for instance, and the protrusion 7 is fitted with a corresponding groove or hole of the housing and functions as a positioning and retaining portion.

Figure 7:
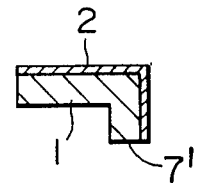
FIG. 7 illustrates another example of the arrangement of a positioning and retaining portion in accordance with the present invention.

In the above-described embodiment, although the protrusion 7 protruding radially outwardly is provided as the positioning and retaining portion, a protrusion 7' having an L-shape, as shown in FIG. 7, may be provided as the positioning and retaining portion. This protrusion 7' is fitted with a corresponding groove or hole in the housing to serve as a positioning and retaining portion.

Furthermore, an arrangement in which a hole or a groove (not shown) is simply provided at a predetermined position of the thrust bearing 8 may alternatively be provided as the positioning and retaining portion. A projecting portion provided on the housing is fitted with this hole or groove, thereby positioning and retaining the thrust bearing 8.

The protrusion 7, the protrusion 7', the hole, or the groove constitute examples of the arrangement of the positioning and retaining portion in accordance with the present invention. However, the positioning and retaining portion should not be restricted to these examples. In short, the positioning and retaining portion may be provided with any form within a range in which stamping can be performed, insofar as it is capable of positioning and retaining the thrust bearing with respect to the housing.

In the embodiment described above, although the thrust bearing has a positioning and retaining portion, such a positioning and retaining portion may be omitted depending on usage. In cases where the positioning and retaining portion is not provided, the thrust bearing may be used by being provided on both surfaces thereof with a sliding surface formed by a sliding material (e.g., a solid sliding bearing alloy) and by being fitted between a side surface of the housing and a side surface of a rotary shaft. In such an arrangement, the thrust bearing is so arranged in design that it can be rotated between the side surface of the housing and the side surface of the rotary shaft.

Figure 8:
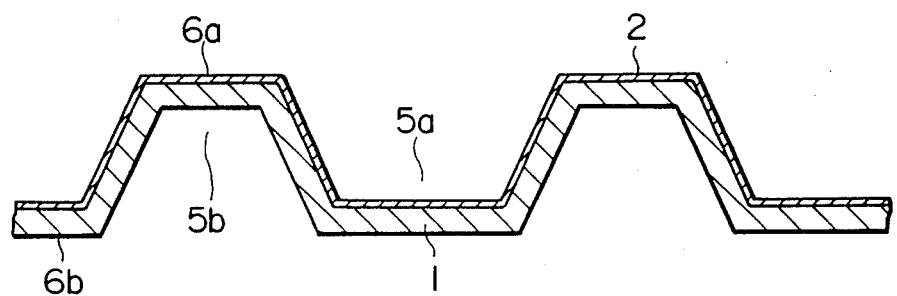
FIG. 8 illustrates another embodiment of the present invention and is a cross-sectional view corresponding to FIG. 2.

FIG. 8 shows a cross-section of another embodiment of the present invention, in which the tops of the projections 6a are respectively formed into a planar shape.

Figure 9:
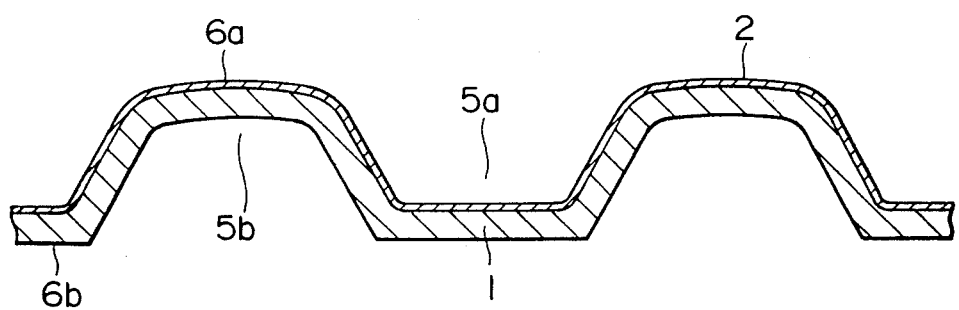
FIG. 9 illustrates still another embodiment of the present invention and is a cross-sectional view corresponding to FIG. 2.

FIG. 9 shows a cross-section of still another embodiment of the present invention, in which are tops of the projections 6a are formed in such a manner that central portions thereof are slightly raised.

It should be noted that, although in the foregoing embodiments a bimetal is used as the material, the material should not be restricted to the same, and it goes without saying that a plate formed of a solid bearing alloy material may be used.

The present invention has the following advantages:

(1) Since the collar of a bush with a collar in the prior art is separated in the present invention, and the thrust bearing is formed separately, production by stamping is faciliated, and a high dimensional accuracy can be obtained. As a result, a material for the thrust bearing suited to a given situation can be selected regardless of the radial bearing. Accordingly, there are advantages in that this arrangement leads to a reduction in costs, and that the thrust bearing excels in performance and is easy for user to handle.

(2) Since a plurality of indented portions deformed in the direction of the thickness are provided, the rigidity of the thrust bearing increases. The recesses constitute passages for influx of lubricating oil to sliding surfaces to improve lubrication, while the indented portions are distributed in the circumferential direction. As a result, this thrust bearing exhibits a resilient structure and demonstrates a multi-pad effect. In addition, if projections in which central portions thereof are slightly raised, as shown in FIG. 9, are provided, an oil film can be formed more easily on the sliding surfaces. Furthermore, by virtue of these indented portions, misalignment can be absorbed favorably, and it becomes possible to assemble the thrust bearing and a housing with no gap by making use of the resilient effect of the thrust bearing. This results in an effect of checking the vibration of a shaft. Hence, the material costs can be reduced and the thrust bearing becomes light in weight as compared with a thrust bearing which is not provided with indented portions.

(3) Since a positioning and retaining portion can be formed in a very simple arrangement, even if the thrust bearing is formed separately from the radial bearing, no particular inconveniences arise in installing the thrust bearing.

What is claimed is:

1. A ring-shaped thrust bearing formed by stamping a plate made of a bearing alloy material or a plate having a bearing alloy layer, comprising:

an upper surface and a lower surface, said upper surface and lower surface having circumferentially arranged, alternating and adjacent projections and recesses, said projections along said upper surface having tops defining sliding surfaces and bottoms defining recesses in said lower surface of said ring, said recesses along said upper surface having tops defining a bottom of an oil groove, and bottoms defining an opposing contact surface, whereby said stamped plate has an undulating transverse cross-section, said recesses and projections having been formed by deforming said plate in the direction of the thickness thereof.

2. A ring-shaped thrust bearing formed by stamping a plate made of a bearing alloy material or a plate having a bearing alloy layer, comprising:

an upper surface and a lower surface, said upper surface and lower surface having circumferentially arranged, alternating and adjacent projections and recesses, said projections along said upper surface having tops defining sliding surfaces and bottoms defining recesses in said lower surface of said ring, said recesses along said upper surface having tops defining a bottom of an oil groove, and bottoms defining an opposing contact surface, whereby said stamped plate has an undulating transverse cross-section, said recesses and projections having been formed by deforming said plate in the direction of the thickness thereof; and a positioning and retaining portion for positioning and retaining said thrust bearing in a bearing housing.

* * * * *